US012811179B2

(12) United States Patent
Kang et al.

(10) Patent No.: US 12,811,179 B2
(45) Date of Patent: Nov. 24, 2026

(54) PRESSURE CONTROL OF BATTERY CELLS

(71) Applicant: GM Global Technology Operations LLC, Detroit, MI (US)

(72) Inventors: Jun-mo Kang, Ann Arbor, MI (US); Insu Chang, Troy, MI (US); Yongjie Zhu, Troy, MI (US); Chunhao J. Lee, Troy, MI (US); Chen-fang Chang, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 676 days.

(21) Appl. No.: 18/355,761

(22) Filed: Jul. 20, 2023

(65) Prior Publication Data

US 2025/0030039 A1 Jan. 23, 2025

(51) Int. Cl.

| | |
|---|---|
| ***H01M 10/04*** | (2006.01) |
| ***B60L 50/64*** | (2019.01) |
| ***B60L 58/10*** | (2019.01) |
| ***H01M 10/48*** | (2006.01) |
| ***H01M 50/202*** | (2021.01) |

(Continued)

(52) U.S. Cl.

CPC ......... *H01M 10/0481* (2013.01); *B60L 50/64* (2019.02); *B60L 58/10* (2019.02); *H01M 10/48* (2013.01); *H01M 50/202* (2021.01); *H01M 50/211* (2021.01); *H01M 50/242* (2021.01); *H01M 50/249* (2021.01); *B60L 2240/54* (2013.01); *H01M 2200/20* (2013.01); *H01M 2220/20* (2013.01)

(58) Field of Classification Search

None

See application file for complete search history.

(56) References Cited

U.S. PATENT DOCUMENTS

2020/0411819 A1 12/2020 Seki et al.

FOREIGN PATENT DOCUMENTS

CN 115133202 A * 9/2022 ........ H01M 10/6563
CN 115133202 B * 8/2024 ........ H01M 10/6563

(Continued)

OTHER PUBLICATIONS

Wen, CN 115133202 B, English Translation from FIT (Year: 2024).*

(Continued)

*Primary Examiner* — Colin W. Slifka

(74) *Attorney, Agent, or Firm* — CANTOR COLBURN LLP

(57) ABSTRACT

A pressure management system includes a pressure plate configured to be disposed at an initial position relative to a battery cell in a housing, the initial position including a first orientation, a tilting assembly configured to allow the pressure plate to change from a first orientation to a second orientation based on the expansion force being non-uniform. The system includes a mechanical linkage attached to the pressure plate and configured to move laterally in response to the expansion force and translate the expansion force to a reactive force, and a biasing system including a biasing member configured to resist a lateral movement of the mechanical linkage. The biasing system is configured to apply a biasing force that causes the mechanical linkage to apply the reactive force, and based on the expansion force being non-uniform, is controllable to change the biasing force to balance an internal pressure of the cell.

20 Claims, 11 Drawing Sheets

(51) Int. Cl.
*H01M 50/211* (2021.01)
*H01M 50/242* (2021.01)
*H01M 50/249* (2021.01)

(56) References Cited

FOREIGN PATENT DOCUMENTS

| | | | |
|---|---|---|---|
| DE | 102014221944 | A1 | 4/2016 |
| DE | 102019007748 | A1 | 5/2021 |

OTHER PUBLICATIONS

Wen, CN 115133202 A, English Translation from FIT (Year: 2022).*

German Office Action for German Application 102023128148.8, issued Feb. 7, 2024; 5 pages.

* cited by examiner

PRESSURE CONTROL OF BATTERY CELLS

INTRODUCTION

The subject disclosure relates to battery systems, and more particularly to managing pressure of battery cells of a battery system.

Battery pouch cells are used in various applications, such as automotive applications (e.g., in electric and hybrid vehicles). For example, electric and hybrid vehicles include battery systems that include battery packs housing multiple battery cells, which may include pouch type cells such as lithium-ion cells. As such cells charge and discharge, and as such cells age, the pressure can change, which can be detrimental to the charging and power storage capability. It is desirable to provide mechanisms that maintain battery cells at a substantially constant pressure over their operating lifetimes.

SUMMARY

In one exemplary embodiment, a pressure management system includes a pressure plate configured to be disposed at an initial position relative to a battery cell, the battery cell disposed in a housing, the initial position including a first orientation, where expansion of the battery cell causes an expansion force to be applied to the pressure plate, and a tilting assembly configured to allow the pressure plate to change from the first orientation to a second orientation based on the expansion force being non-uniform. The pressure management system also includes a mechanical linkage attached to the pressure plate, the mechanical linkage configured to move laterally in response to the expansion force and translate the expansion force to a reactive force that is opposed to the expansion force, and a biasing system including a biasing member configured to resist a lateral movement of the mechanical linkage. The biasing system is configured to apply a biasing force in a direction opposite a direction of the lateral movement, the biasing force causing the mechanical linkage to apply the reactive force as a selected proportion of the expansion force, and based on the expansion force being non-uniform, the biasing system is controllable to change the biasing force and the reactive force to balance an internal pressure of the battery cell.

In addition to one or more of the features described herein, a surface of the pressure plate defines a plane that is orthogonal to a direction of the expansion force when the pressure plate is in the first orientation, and the surface defines an angle relative to the plane when the pressure plate is in the second orientation.

In addition to one or more of the features described herein, the tilting assembly includes a wheel attached to an end of the pressure plate, the wheel configured to engage a side wall of the housing and rotate along the side wall.

In addition to one or more of the features described herein, the biasing member has a spring constant selected so that the biasing force causes the reactive force to be the selected proportion of the expansion force.

In addition to one or more of the features described herein, the biasing system includes a bias control device connected to the pressure plate, the bias control device configured to be operated to adjust the biasing force of the biasing member.

In addition to one or more of the features described herein, the bias control device is configured to restrict the lateral movement of the mechanical linkage, the reactive force generated based on the bias control device causing a portion of a lateral force generated by the mechanical linkage to be directed toward the battery cell.

In addition to one or more of the features described herein, the biasing member is a spring having a first end configured to be coupled to the mechanical linkage, and a second end connected to the bias control device.

In addition to one or more of the features described herein, the biasing system includes a set of sensors configured to measure a parameter related to the internal pressure, and a controller configured to estimate a pressure imbalance based on the measured parameter and control the bias control device to balance the internal pressure.

In addition to one or more of the features described herein, the bias control device includes a pinion gear coupled to a linear gear, the pinion gear connected to an actuator, the actuator configured to rotate the pinion gear to adjust the biasing force.

In another exemplary embodiment, a method of controlling a pressure of a battery cell includes receiving an expansion force at a pressure plate disposed at an initial position relative to the battery cell, the battery cell disposed in a housing, the initial position including a first orientation, the expansion force resulting from expansion of the battery cell, the pressure plate coupled to a tilting assembly configured to allow the pressure plate to change from a first orientation to a second orientation based on the expansion force being non-uniform. The method also includes managing a pressure of the battery cell by a pressure management system including a mechanical linkage attached to the pressure plate and a biasing system, where managing the pressure includes translating the expansion force to a reactive force based on a lateral movement of the mechanical linkage, the reactive force configured to oppose the expansion force. Managing the pressure also includes controlling the reactive force based on resisting the lateral movement of the mechanical linkage by a biasing member of the biasing system, the biasing system applying a biasing force in a direction opposite a direction of the lateral movement, the biasing force causing the mechanical linkage to apply the reactive force as a selected proportion of the expansion force, and based on the expansion force being non-uniform, adjusting the biasing force and the reactive force to balance an internal pressure of the battery cell.

In addition to one or more of the features described herein, the tilting assembly includes a wheel attached to an end of the pressure plate, the wheel configured to engage a side wall of the housing and rotate along the side wall.

In addition to one or more of the features described herein, the biasing member has a spring constant selected so that the biasing force causes the reactive force to be the selected proportion of the expansion force.

In addition to one or more of the features described herein, the biasing system includes a bias control device connected to the pressure plate, the bias control device configured to be operated to adjust the biasing force of the biasing member.

In addition to one or more of the features described herein, the bias control device is configured to restrict the lateral movement of the mechanical linkage, the reactive force generated based on the bias control device causing a portion of a lateral force generated by the mechanical linkage to be directed toward the battery cell.

In addition to one or more of the features described herein, the biasing system includes a set of sensors configured to measure a parameter related to the internal pressure, and a controller configured to estimate a pressure imbalance based on the measured parameter and control the bias control device to balance the internal pressure.

In addition to one or more of the features described herein, the bias control device includes a pinion gear coupled to a linear gear, the pinion gear connected to an actuator, and adjusting the biasing force includes rotating the pinion gear by the actuator.

In yet another exemplary embodiment, a vehicle system includes a battery system connected to an electric motor of a vehicle, the battery system including a battery cell disposed in a housing, and a pressure management system including a pressure plate disposed at an initial position relative to the battery cell, the battery cell disposed in a housing, the initial position including a first orientation, wherein expansion of the battery cell causes an expansion force to be applied to the pressure plate. The pressure management system also includes a tilting assembly configured to allow the pressure plate to change from the first orientation to a second orientation based on the expansion force being non-uniform, a mechanical linkage attached to the pressure plate, the mechanical linkage configured to move laterally in response to the expansion force and translate the expansion force to a reactive force that is opposed to the expansion force, and a biasing system including a biasing member configured to resist a lateral movement of the mechanical linkage. The biasing system is configured to apply a biasing force in a direction opposite a direction of the lateral movement, the biasing force causing the mechanical linkage to apply the reactive force as a selected proportion of the expansion force, and based on the expansion force being non-uniform, the biasing system is controllable to change the biasing force and the reactive force to balance an internal pressure of the battery cell.

In addition to one or more of the features described herein, the tilting assembly includes a wheel attached to an end of the pressure plate, the wheel configured to engage a side wall of the housing and rotate along the side wall.

In addition to one or more of the features described herein, the biasing system includes a bias control device connected to the pressure plate, the bias control device configured to be operated to adjust the biasing force of the biasing member, and the bias control device is configured to restrict the lateral movement of the mechanical linkage, the reactive force generated based on the bias control device causing a portion of a lateral force generated by the mechanical linkage to be directed toward the battery cell.

In addition to one or more of the features described herein, the biasing system includes a set of sensors configured to measure a parameter related to the internal pressure, and a controller configured to estimate a pressure imbalance based on the measured parameter and control the bias control device to balance the internal pressure.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
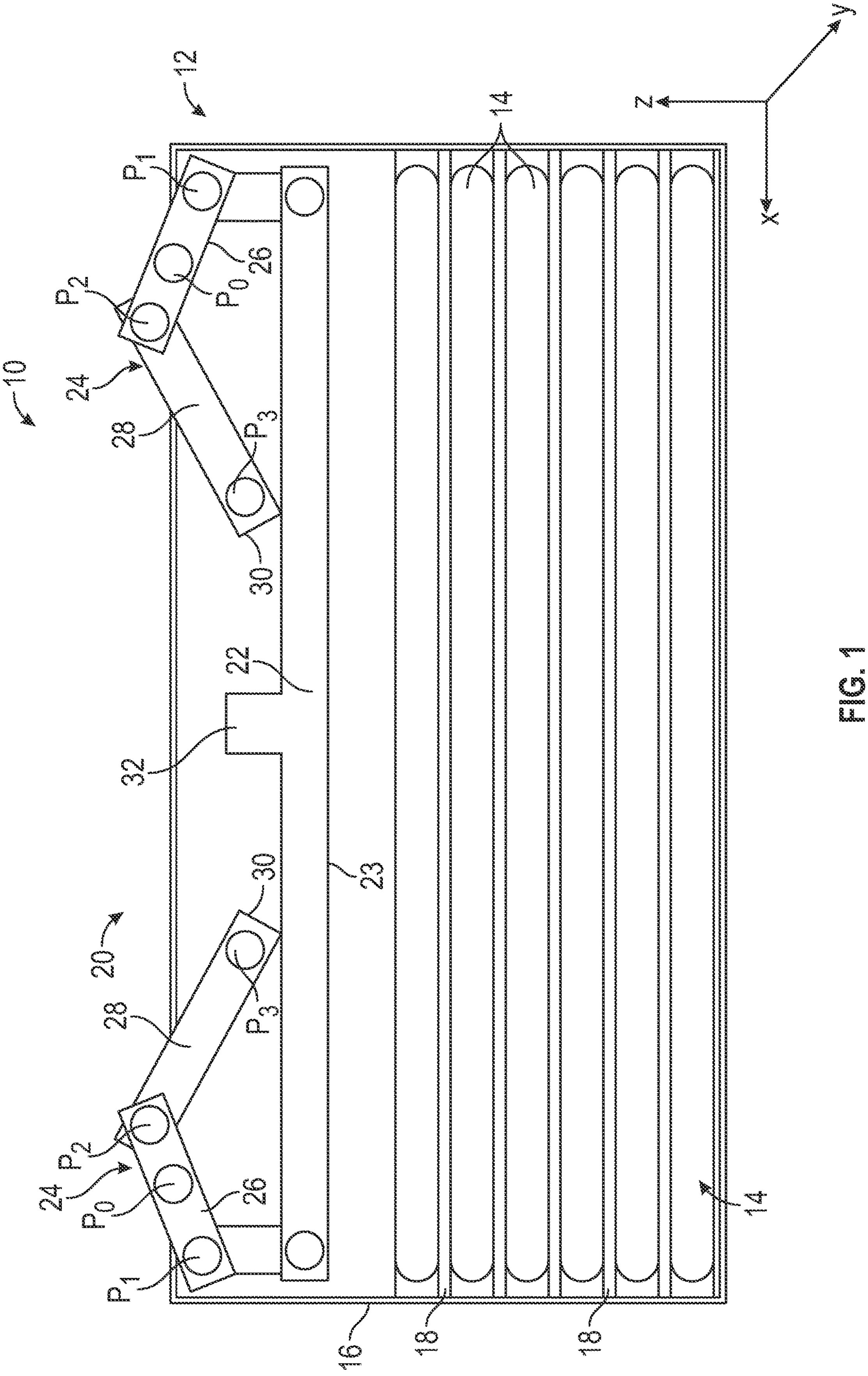
FIG. 1 depicts an energy storage system including a housing that holds one or more battery cells, and a pressure management system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for controlling pressure in battery assemblies and battery systems. An embodiment of a pressure management system includes a pressure plate disposed in a housing of a battery assembly (e.g., a battery pack or battery module), and moveable in response to an expansion force generated by expansion of a battery cell or cells in the housing. The pressure management system also includes one or more mechanical linkages that translate a portion of the expansion force into a reactive force or reverse force to maintain or achieve a desired pressure in the battery cell(s), or otherwise compensate for changes in battery cell pressure and/or volume. In an embodiment, the pressure management system includes a biasing system that cooperates with the mechanical linkage(s) to generate the reverse force. The biasing system may be controllable to control an internal pressure of the battery cell(s).

In an embodiment, a mechanical linkage includes a first elongated member (referred to as a "pivot member") and a second elongated member (referred to as a "linking member"). The pivot member is attached, for example, at one end by a pivot to the pressure plate, and is attached at another end to an end of the linking member by another pivot. The pivot member is also attached to a fixed pivot attached to the housing. When an expansion force is applied to the pressure plate, movement of the pressure plate causes an end of the linking member to move laterally (i.e., along the pressure plate and/or in a direction orthogonal to the expansion force direction) toward a stop component. Upon the linking member engaging a stop component, lateral force applied by the linking member is translated to a reactive force or reverse force that is proportional to the expansion force. Embodiments of the pressure management may be configured to provide a reverse force that is directly proportional to the expansion force.

In an embodiment, the pressure management system includes a biasing system that is selectable to control the reverse force (e.g., cause the reverse force to be a desired proportion of the expansion force). For example, the biasing system includes a laterally extended spring that is attached to the stop component. When a linking member moves a given distance, the linking member engages the spring, and the spring applies a spring force that opposes movement of the linking member. The magnitude of the spring force can be calibrated or adjusted, for example, by selecting a spring having an appropriate spring constant and/or by incorporating a spring adjuster that can be actuated to modify the spring force.

In an embodiment, the pressure management system is configured to have (or be moved to) a variable tilt or orientation, which allows the pressure management system to maintain a balanced pressure in conditions where the expansion force is not uniform. For example, the pressure plate is coupled to opposing wheels that allow ends of the plate to move along one or more sides of the housing. Embodiments are not limited to wheels, as embodiments may include any component or mechanism that allows the pressure plate to tilt and apply a balanced or uniform pressure in a battery cell or cells.

The biasing system, in an embodiment, is controllable in order to adjust the biasing system to compensate for pressure imbalances in a battery cell or cells. For example, the spring adjuster is controllable to vary the proportion of the expansion force that is applied to a battery. For example, the pressure management system includes a mechanical linkage at each side of the pressure plate. A spring or other biasing member is coupled to each linkage and attached to the spring adjuster. If the expansion force at one linkage (local expansion force) is different than the expansion force at the other linkage, the biasing force of one or more of the springs is adjusted using the spring adjuster so that local expansion forces are equal or within a desired difference.

Embodiments described herein present numerous advantages and technical effects. The embodiments provide for an improved battery functionality by maintaining a constant force on battery cells over their lifetime, and thereby effectively controlling pressure and avoiding negative effects such as dendrite growth. In addition, embodiments provide effective pressure control that requires a smaller volume than existing systems. In addition, embodiments are able to maintain desired battery cell pressure under both uniform conditions (i.e., conditions in which the expansion force is uniform across the pressure plate) and non-uniform conditions (i.e., conditions in which expansion is non-uniform and the reverse force is not balanced).

Embodiments are advantageous compared to existing pressure compensation systems. For example, existing systems can employ a spring that opposes expansion forces; however, such systems require significant increases in volume needed for battery modules or housings to accommodate springs with sufficient spring force to maintain desired pressures. Embodiments are able to provide effective pressure management with a relatively small volume.

FIG. 1 depicts an embodiment of an energy storage device or system 10, which includes a battery module 12 that houses a set (i.e., one or more) of battery cells 14. Each battery cell 14 may be any type of cell that is rechargeable, such as a lithium-based cell (e.g., lithium-ion, lithium metal (LMB), etc.). For example, each cell 14 is a pouch-type lithium-ion cell.

The module 12 includes a housing 16 in which one or more battery cells 14 are disposed. If multiple cells are housed, they may be stacked as shown, in which adjacent cells 12 are separated by a support plate 18. It is noted that embodiments described herein are not limited to the type or dimensions of the housing 16, the type, dimensions or number of cells shown, or the type of cells shown.

The battery module 12 includes or is coupled to a pressure management system 20 configured to provide automatic management of pressure in the cells 14. The pressure management system 20 includes a pressure plate 22 disposed above the cells 14. The pressure plate 22 has a default position, which may be a position in which the pressure plate 22 contacts a cell 14 (e.g., rests on the uppermost cell 14). Alternatively, as shown in FIG. 1, the default position defines a separation or gap that allows for some amount of cell expansion before pressure compensation or management is triggered. It is noted that the pressure plate 22 can be disposed at any position or location (e.g., below the battery cells 14) such that expansion of the battery cells cause movement of the pressure plate 22.

A pressure compensation device is disposed on or otherwise connected to the pressure plate 22, and is configured to apply a reactive force on the pressure plate to compensate for expansion of the cells 14 and maintain the cells 14 at a desired pressure (or within a desired pressure range).

The pressure compensation device includes a set (i.e., one or more) of mechanical linkages 24 that translate a force on the pressure plate 22 to a reverse force (i.e., in a direction that opposes the expansion force). For example, as the cells 14 expand and exert an upward force on the pressure plate, the mechanical linkages 24 operate to exert a proportional downward force. Each linkage 24 can be calibrated to provide a downward force that maintains a constant selected pressure on the cells as they expand.

As shown in FIG. 1, the pressure compensation device includes two linkages 24 at opposing ends of the pressure plate 22. The pressure plate 22 is oriented so that a surface 23 facing the cells 14 defines a plane that is orthogonal to a direction of expansion. For example, the direction of expansion is along a z-axis (i.e., in a z-direction), and the surface is parallel to a plane defined by an x-axis and a y-axis. The pressure plate 22 may be configured so that the orientation of the pressure plate 22 is constant, or may be configured to be able to tilt in response to a non-uniform expansion force, as discussed further herein.

Each mechanical linkage 24 includes a first member 26 ("pivot member") that is positioned relative to the housing 16 at a fixed pivot point P0 (i.e. a pivot point that has a fixed position relative to the housing 16) about which the pivot member 26 can rotate. One end of the pivot member 26 is attached to the pressure plate 22 at a pivot point P1, such that the pivot member 26 is rotatable about the pivot point P1. Another end of the pivoting member 26 is attached to an end of a linking member 28 at a pivot point P2.

An opposing end of the linking member 28 is coupled to the pressure plate 22, such that when a force due to expansion (referred to as an "expansion force" denoted by $F_e$) exceeds some threshold force Ft, the expansion force $F_e$ pushes the plate upward (in the z-direction). This causes the pivot member 26 to rotate about the pivot point P0. Rotation of the pivot member 26 in turn causes an end 30 and a point P3 of the linking member 28 to move laterally (e.g., in the x-direction) or apply a lateral force toward a center of the pressure plate 22. A "lateral" direction may be a direction (e.g., in the x-y plane) orthogonal to a direction of the expansion force, and/or may be a direction along a surface of the pressure plate 22 (e.g., a direction in a plane defined by the surface 23).

The pressure plate 22 includes or is attached to a stop component 32, which may be a raised structure that counteracts lateral movement of the linking members 28. When a linking member 28 engages the stop component 32, the counteracting lateral forces cause a reactive force (also referred to as a "reverse force" denoted by $F_r$) to be applied to the cell 14. The reverse force $F_r$ is proportional to the expansion force $F_e$. Parameters of the mechanical linkages 24 may be selected to calibrate the mechanical linkages 24 to achieve a desired proportionality of the reverse force. Examples of such parameters include the lengths of the pivot member 26 and the linking member 28, a height of the pivot point P1, a location of the pivot point P2, a location of the stop component 32 and others. As discussed further herein, parameters of a biasing system may also be selected or adjusted to calibrate the pressure management system 20.

The pressure management system 20, in an embodiment, includes a biasing system that provides one or more components configured to control the amount of reverse force $F_r$, i.e., control a proportion of the expansion force $F_e$ that is redirected toward the cell 14. The biasing system may be a passive or active system that can be designed so as to maintain and/or adjust a desired proportion.

Figure 2A:
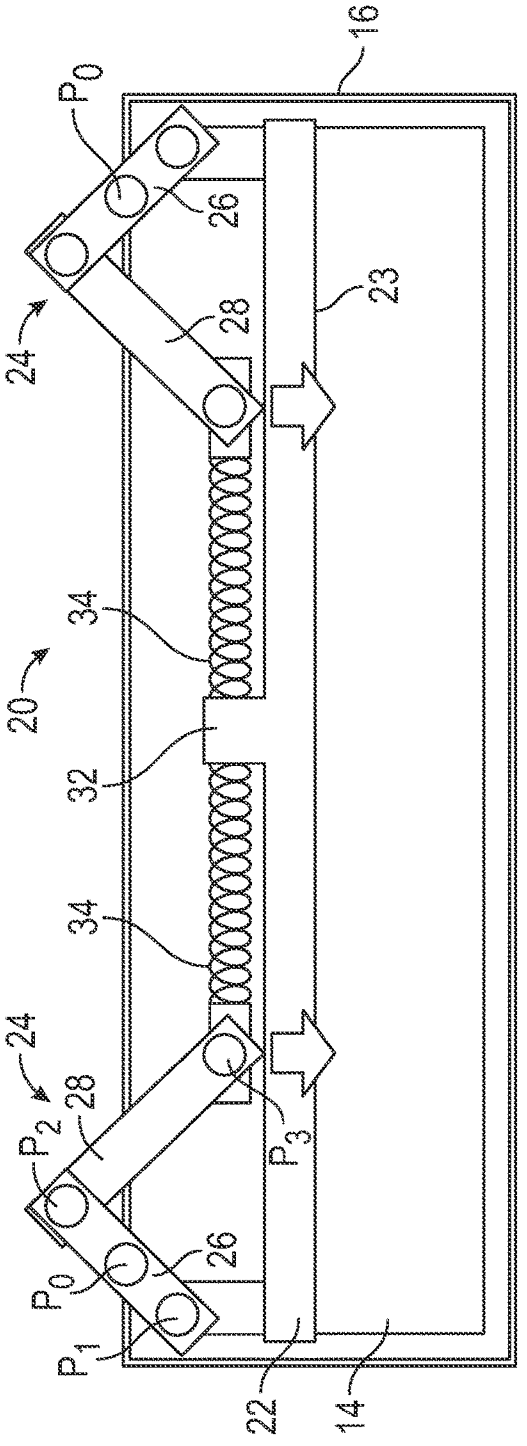
FIGS. 2A and 2B depict an energy storage system including a pressure management system including one or more mechanical linkages and a biasing system, in accordance with an exemplary embodiment.
Figure 2B:
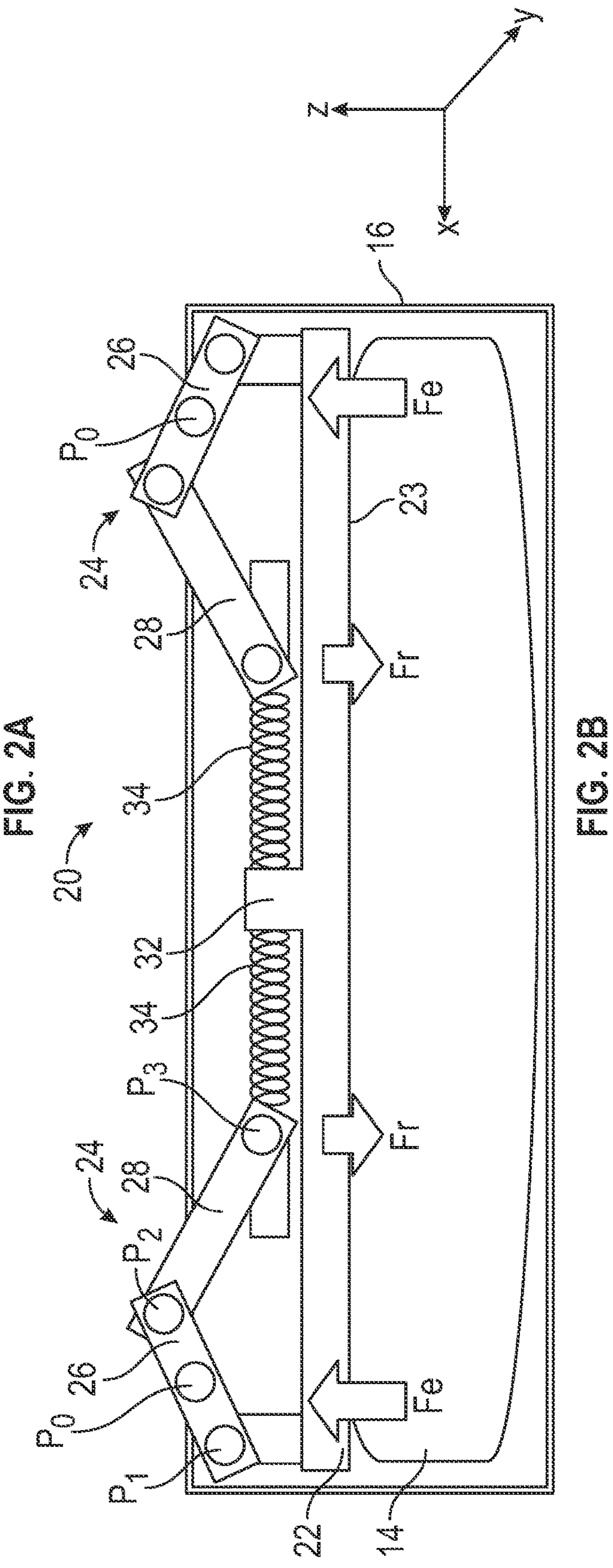

FIGS. 2A and 2B show an embodiment of the pressure management system 20, in which the system is a passive system. In this embodiment, the pressure management system 20 includes a laterally extending spring 34 that is configured to resist lateral movement of each linking member 28. Each spring 34 exerts a biasing force that opposes the lateral movement. FIG. 2A shows the pressure plate 22 in an initial or default position, at which a default reverse force Fa is exerted on the cell 14.

As shown, each spring 34 is connected to or attached to the stop component 32 at one end of the spring 34. The other end of each spring 34 is located laterally away from the stop component 32, and is configured to engage with a respective linking member 28.

The biasing force is a function of a spring constant k of the spring 34. When the cell 14 expands and applies an expansion force to the pressure plate 22, upward movement of the pressure plate 22 causes each pivot member 24 to rotate about the fixed pivot point P0, which in turn causes the linking member 28 to move laterally and apply a lateral force on the spring 34 and compress the spring 34, as shown in FIG. 2B. The spring 34 exerts an opposing biasing force (also referred to as a "spring force"), which is dependent on the spring constant.

By selecting an appropriate spring constant k, the magnitude of the reverse force $F_r$ can be set as a selected proportion of the expansion force $F_e$. For example, a spring with a higher spring constant (and higher stiffness) corresponds to a higher proportion, and a spring with a lower spring constant corresponds to a lower proportion.

It is noted that embodiments are not limited to the number and location of the mechanical linkages described herein. For example, the pressure compensation device may include one linkage on one side of the pressure plate 22. In addition, there may be more than one linking mechanism 24 arrayed along the y-direction.

Figure 3:
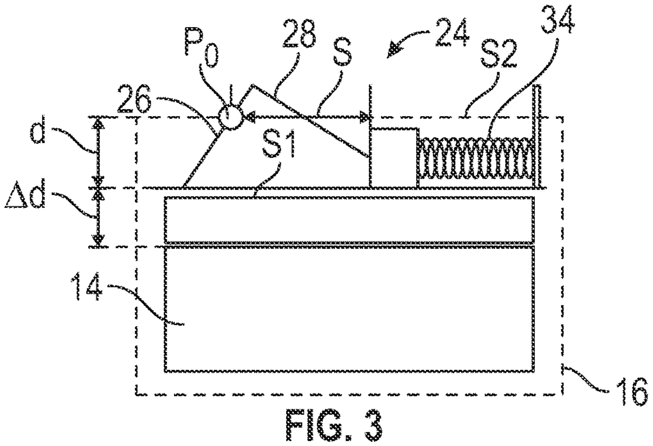
FIG. 3 schematically illustrates a pressure management system, in accordance with an exemplary embodiment.
Figure 4:
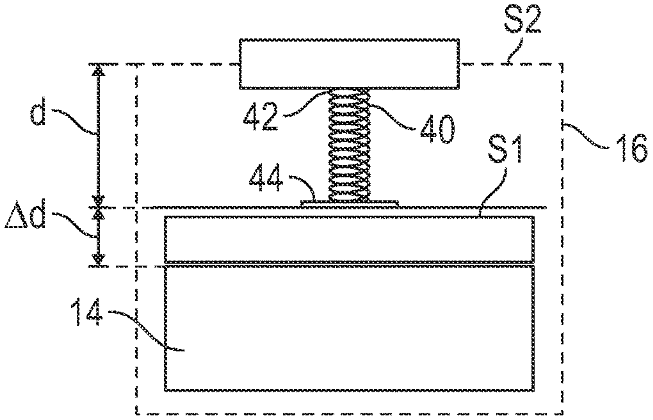
FIG. 4 schematically illustrates a conventional pressure management system.
Figure 5:
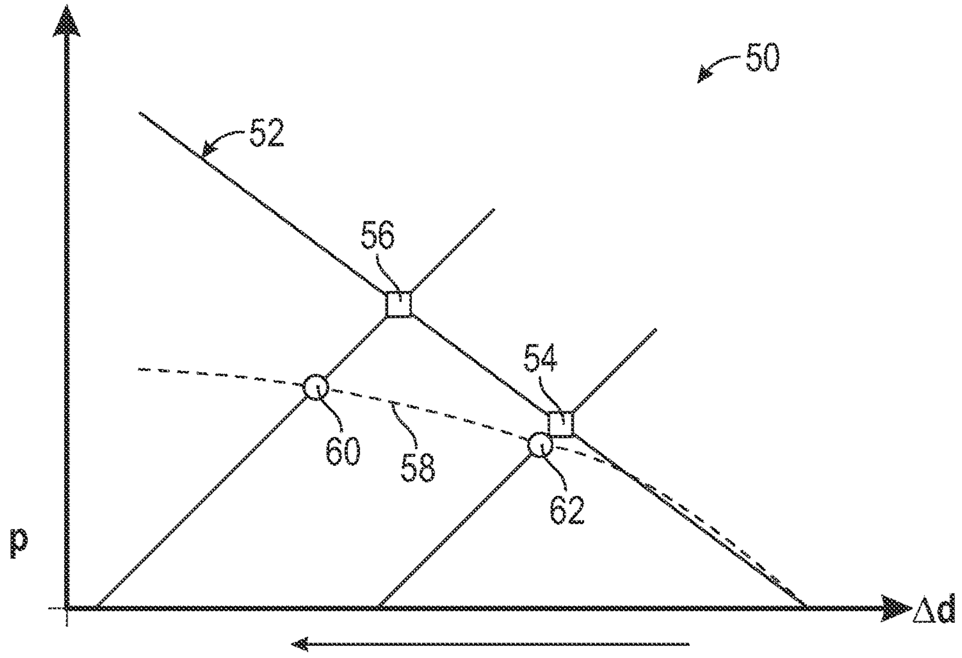
FIG. 5 is a graph that depicts parameters of the pressure management system of FIG. 3, in comparison with parameters of the conventional pressure management system of FIG. 4.

FIGS. 3 and 4 depict aspects of a pressure management system as described herein, and aspects of a conventional system. FIG. 5 also illustrates a comparison between characteristics of embodiments described herein and a conventional system.

Aspects of the battery cell 14, in conjunction with a mechanical linkage 24 and a lateral spring 34, are shown schematically in FIG. 3. For comparison, an example of a conventional system is shown in FIG. 4, which includes a vertically oriented spring 40 having a fixed end 42 attached to the housing 16 and a moveable end 44 that exerts a vertical spring force on the cell 14. The lateral spring 34 and the spring 40 have the same spring constant.

In FIGS. 3 and 4, a distance d is defined between a surface S1 of the cell 14 and an upper surface S2 of the housing 16 when the cell is at 100% state of charge (SOC) and is fully expanded. As the SOC lowers, the surface of the cell recedes, increasing the overall distance between the cell surface S1 and the upper surface S2 by a distance Δd. At 100% SOC, and as the SOC decreases, Δd decreases toward zero.

FIG. 5 shows a graph 50 of force F as a function of Δd. In the graph 50, Δd is at a maximum at the graph origin, and reduces to zero as the cell 14 expands. A curve 52 shows the spring force of the vertical spring 40, which increases linearly as a function of Δd. A point 54 represents an equilibrium between the spring force and the expansion force at 0% SOC, and a point 56 represents the equilibrium at 100% SOC.

FIG. 5 also includes a curve 58 representing the spring force from the spring 34 of an embodiment of the pressure management system 20. A point 60 represents an equilibrium between the spring force and the expansion force at 0% SOC, and a point 62 represents the equilibrium at 100% SOC. The shape of the curve is affected by the spring constant and design of the linking mechanism.

Thus, as shown, the pressure management system 20 can effectively maintain a constant pressure with a smaller volume due to horizontally orienting the spring 34 and the mechanical linkage 24.

Figure 6A:
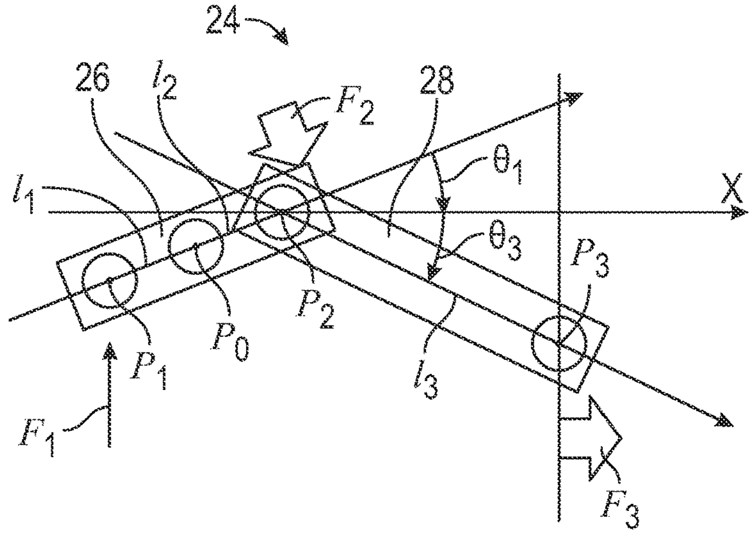
FIGS. 6A-6C are force diagrams depicting various forces generated during operation by a linking mechanism in cooperation with the biasing system of FIGS. 2A and 2B, in accordance with an exemplary embodiment.
Figure 6B:
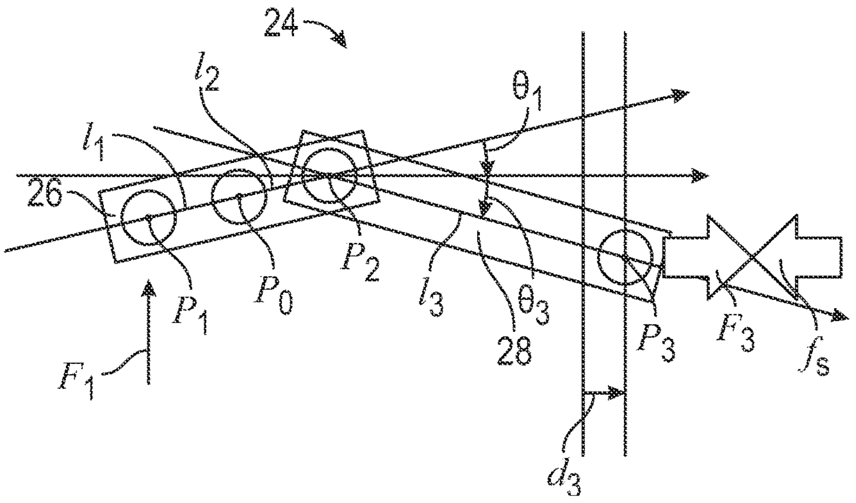
Figure 6C:
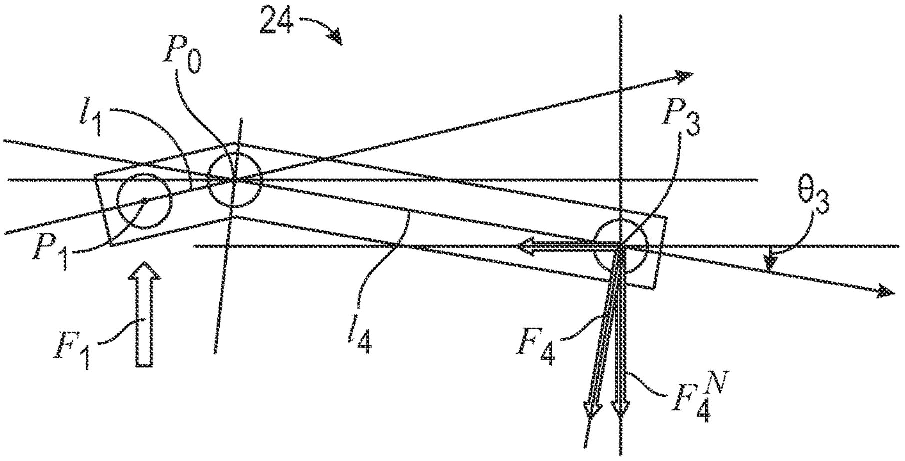

FIGS. 6A-6C are force diagrams depicting aspects of force transfer using a mechanical linkage 24 and a biasing member such as the spring 34. FIGS. 6A-6C also illustrate aspects of calculation of forces and selection of spring properties to achieve a desired reverse force.

In these diagrams, li is a length in the x-direction from point P1 to point P0, 12 is a length from point P0 to point P2, and $l_3$ is a length from point P2 to point P3. The pivot member 26 defines an angle $\theta_1$ with respect to the x-axis (or a direction of lateral movement of the end 30), and the linking member 28 defines an angle $\theta_3$ with respect to the x-axis.

As shown in FIG. 6A, when a force F1 (the expansion force) is applied vertically (in the z-direction or parallel to the direction of expansion) to the pressure plate 22, the pivot member 26 rotates about the pivot point P0, causing a force $F_2$ on the linking member 28, which in turn causes the linking member 28 to move in the x-direction and generate a lateral force $F_3$.

As shown in FIG. 6B, the linking member 28 pushes against the spring 34, which causes the spring 34 to apply an opposing spring force $f_s$. The spring force $f_s$ is proportional to a distance $d_3$, which is a lateral distance that point P3 moves as a result of the expansion force. The spring 34 has a spring constant k, and the spring force $f_s$ is k multiplied by $d_3$ ($f_s$=k*$d_3$)

When the linking mechanism 24 is in a steady state condition, the linking mechanism 24 does not move. The pivot member 26 and the linking member 28 can be considered a rigid body with a fulcrum at point P0, as illustrated in FIG. 6C. In this condition, the linking mechanism 24 exerts a force $F_4$. The force $F_4$ has a normal component $F_4^N$, which represents the reverse force that is applied to the battery cell 14.

In the steady state condition, the total torque is zero and thus can be represented by:

$$l_1F_1 + l_4F_4 = 0,$$

where $l_4$ is a length from point P0 to P3 (FIG. 6C). Accordingly, $$F_4 = -\frac{l_1}{l_4}F_1.$$

The normal component $F_4^N$, i.e., the reverse force can be calculated based on:

$$F_4^N = F_4 \cos\theta_3 = -\frac{l_1}{l_4}F_1 \cos\theta_3.$$

The length $l_4$ varies as a function of $d_3$ and the spring force $f_s$. Accordingly, the length $l_4$ and the angle $\theta_3$ are a function of k. Thus, k can be selected to calibrate the pressure management system 20 and produce a reactive force that has a desired proportion of the expansion force.

In addition to the spring constant k, other aspects of the pressure management system 20 can be selected or designed to control the reverse force $F_r$. For example, the lengths of the pivot member 26 and the linking member 28, as well as positions of the points P0 and P1, can be varied to affect the reverse force.

In some cases, expansion of a battery cell or cells in a battery assembly is not uniform along the cell (e.g., not uniform along the x-axis). In such situations, the reverse force $F_r$ generated by the mechanical linkages 24 is not uniform, which can result in an uneven pressure distribution in the battery cell(s). Accordingly, the pressure plate 22, in an embodiment, is allowed to tilt or change orientation in response to uneven or non-uniform expansion. This allows the pressure plate 22 to adjust to non-uniform expansion, which can reduce the potential for damage to the battery cell, and allow the reverse force applied via the pressure plate 22 to be effectively controlled in order to compensate for an uneven internal pressure.

For example, in the embodiment of FIGS. 2A and 2B, the pressure plate 22 has a fixed orientation in which the lower surface 23 facing the battery cell 14 is orthogonal to the z-axis and/or the direction of the expansion force. If the local expansion force $F_e$ on one side of the plate 22 (i.e., a portion of the surface 23 between the stop component 32 and an end of the pressure plate 22) is different than the local expansion force $F_e$ on another side of the plate 22, the reaction force $F_r$ applied via the mechanical linkages 24 is not balanced, which can result in an uneven pressure.

Figure 7A:
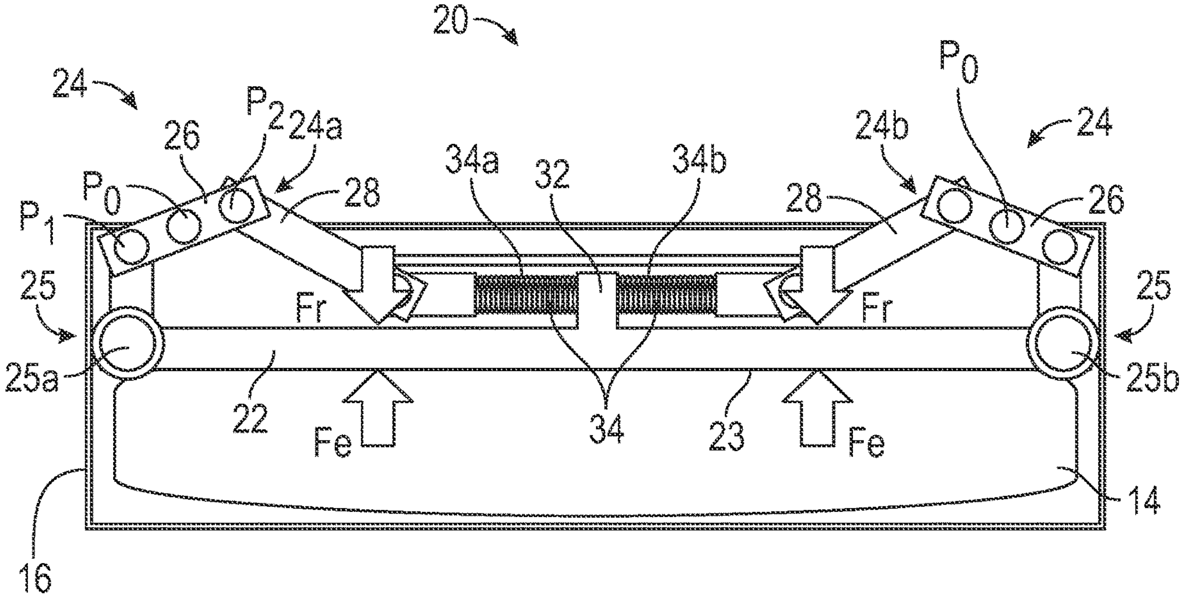
FIGS. 7A and 7B depict an energy storage system including a pressure management system including one or more mechanical linkages and a biasing system attached to a pressure plate, and a tilting system or tilting assembly that allows the pressure plate to tilt or otherwise change orientation, in accordance with an exemplary embodiment.
Figure 7B:
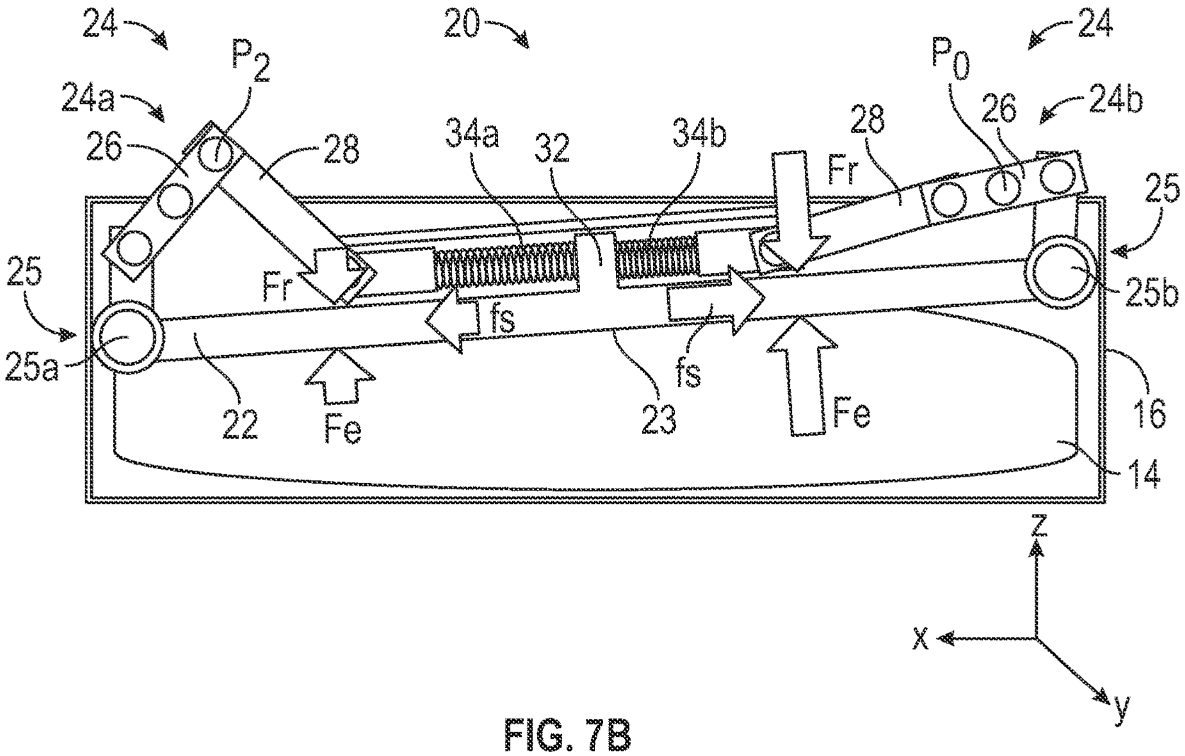

FIGS. 7A and 7B depict an embodiment of the pressure management system that is configured to apply a non-uniform reverse force in response to a non-uniform expansion force. In this embodiment, the pressure plate 22 is attached to, or coupled with a tilting mechanism or tilting assembly that allows the orientation of the pressure plate 22 to vary in response to different conditions of expansion.

As shown, the titling mechanism may be a set of wheels 25 that are attached to the ends of the pressure plate 22, and sized so that each wheel 25 engages a side wall of the housing 16 when installed. For example, a first wheel **25*a* supports the pressure plate 22 at a first side and a second wheel 25*b* supports the pressure plate 22 at a second side. The mechanical linkage 24 at the first side is denoted as linkage 24*a*, and the mechanical linkage 24 at the second side is denoted as linkage 24*b***.

It is noted that embodiments are not limited to the specific type, number and location of components that allow for changes in orientation. The tilting mechanism may be any suitable mechanism or assembly that allows the pressure plate 22 to tilt. Examples include components that can slide along the side walls (e.g., non-rotating cylinders or blocks, optionally including or made from material that provides reduced surface roughness).

FIG. 7A shows the pressure management system in an initial or default state. In this state, the pressure plate 22 is at least substantially orthogonal to the direction of an expansion force $F_e$ (i.e., the surface 23 is orthogonal to the z-axis) and/or the side walls. In this state, any forces exerted by the battery cell 14 are negated by a reverse force exerted by the pressure plate 22. It is noted that the initial state may feature any desired orientation, such as an initial tilted state.

FIG. 7B shows an example of a state of the pressure management system when the battery cell 14 has expanded. In this example, expansion of the battery cell is non-uniform, resulting in a non-uniform or unbalanced expansion force $F_e$. As shown, the local expansion force on the side of the mechanical linkage **24*a* is smaller than the local expansion force on the side of the linkage 24*b*. As each linkage and associated spring 34 applies a proportional reverse force $F_r$, the local reverse force $F_r$ at the linkage 24*a* is smaller than the local reverse force $F_r$ at the linkage 24*b***.

In the embodiment of FIGS. 7A and 7B, the reverse force $F_r$ balances the expansion force $F_e$ and is in equilibrium. However, there may still remain an imbalance in the pressure of the battery cell 14. To maintain a balanced pressure (i.e., a pressure that is the same or similar along a length of the cell 14), the spring force $f_s$ applied by either or both springs 34 can be adjusted so that the pressure plate 22 applies the reverse force so that the internal pressure of the cell 14 is uniform or balanced.

Figure 8A:
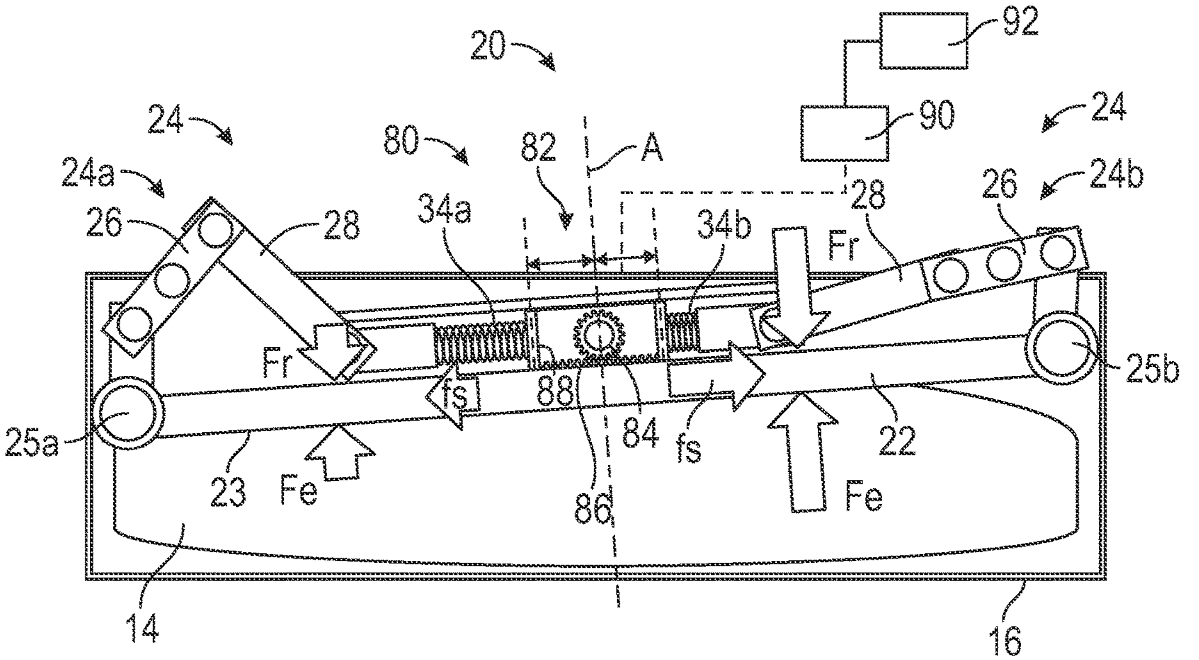
FIGS. 8A and 8B depict an energy storage system including a pressure management system including one or more mechanical linkages and an adjustable biasing system attached to a pressure plate, in accordance with an exemplary embodiment.
Figure 8B:
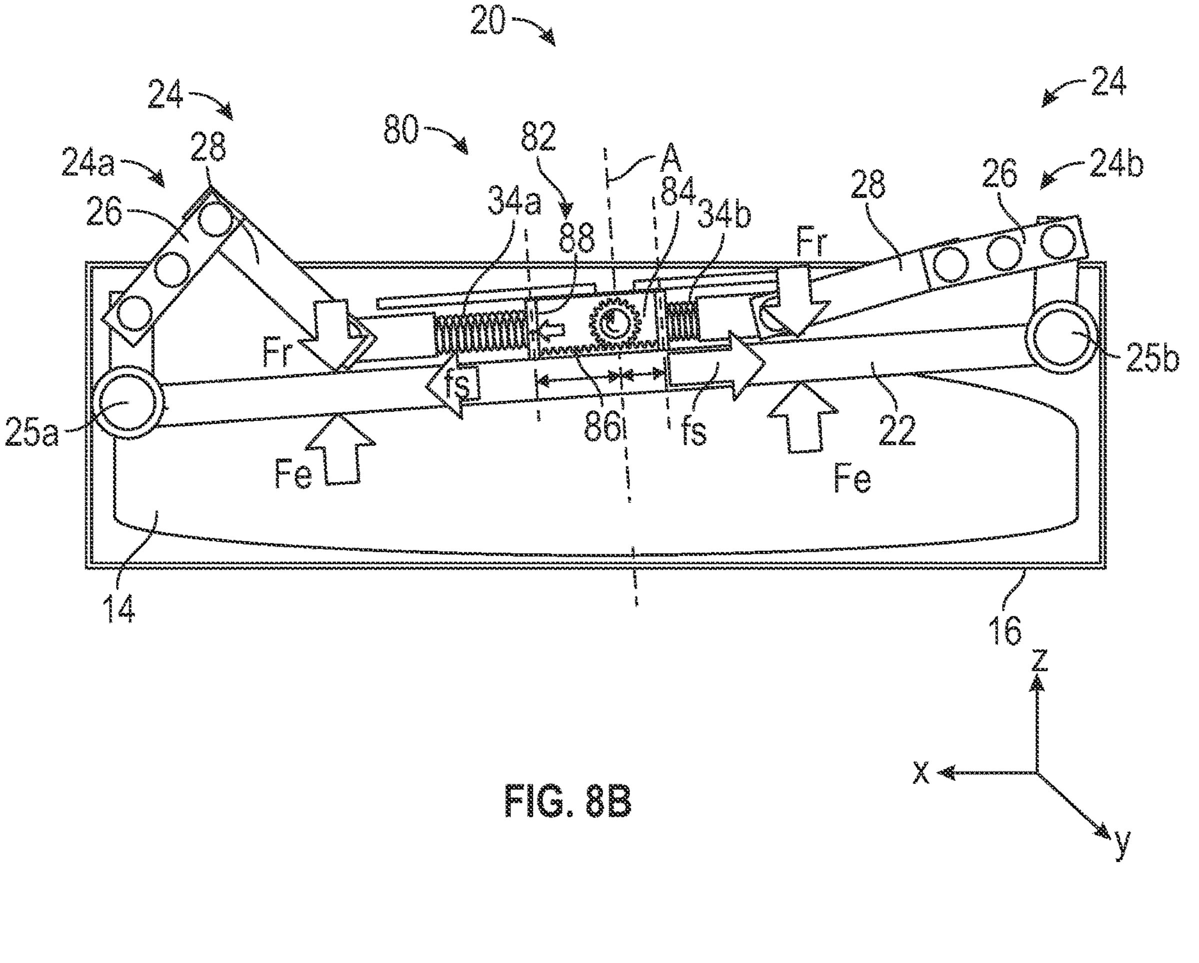

FIGS. 8A and 8B depict an embodiment of the pressure management system 20, which includes a biasing member adjustment system 80. The biasing member adjustment system 80 can be used to control the proportion of the reverse force $F_r$ to compensate for imbalances.

The adjustment system 80 includes an adjustment device, referred to as a spring adjuster 82. The spring adjuster 82 is coupled to the springs 34 and is controllable to increase or decrease spring compression, and thereby control the spring force $f_s$ (i.e., a magnitude of the spring force in response to a given amount of lateral movement).

In an embodiment, the spring adjuster 82 includes a stationary pinion gear 84 that is coupled to at least one linear gear or rack 86 (or other linear actuator). Each linear gear 86 is attached to or otherwise engageable with a respective spring 34 to adjust the spring force $f_s$. For example, each linear gear 86 is attached at an end thereof to an interface component 88 (e.g., a plate or disc) that engages the spring 34.

The pinion gear 84 is coupled to an actuator 90, such as a low power motor, that is operable to rotate the pinion gear 84 to move the linear gears 86 and compress or decompress the springs 34. The actuator 90 may be manually controlled by an operator, or controlled via a controller 92 or other processing device.

FIG. 8A shows a condition in which the cell 14 has expanded and is exerting an uneven expansion force on the pressure plate 22. Although the forces on the pressure plate 22 are in equilibrium, the local forces applied by the battery cell 14 are different. As shown, the local expansion force $F_e$ is greater at the side of the linkage 24*b* than the local expansion force $F_e$ at the side of the linkage 24*a*. This results in the pressure being greater in a region below the linkage 24*b*.

To balance the pressure, the spring adjuster 82 can be controlled to change the spring force $f_s$ of either or both springs 34 as desired. For example, at FIG. 8A, the spring adjuster 82 is in a default state in which a distance from the center of the spring adjuster (shown by central axis A) to one of the springs 34 (denoted as spring 34*a*) is the same as the distance from the center to another of the springs 34 (denoted as spring 34*b*). Due to the uneven expansion of the cell 14, the spring force exerted by the spring 34*a* and the resulting reverse force are smaller than the spring force from the spring 34*b* and associated reverse force.

The spring adjuster 82 may be controlled by rotating the pinion gear 84 to move the linear gear 86 laterally and adjust the spring force $f_s$ of the spring 34*a* and/or 34*b* to balance the pressure. For example, as shown in FIG. 8B, the pinion gear 84 has been rotated clockwise, which moved the linear gear 86 toward the linkage 24*a* to further compress the spring 34*a* and increase the local reverse force $F_r$. This rotation also served to decrease compression of the spring 34*b* and corresponding reduce its local spring force $F_r$. By adjusting the biasing system in this manner, the expansion force is equalized (i.e., the local expansion force $F_e$ at the linkage 24*a* is at least substantially the same as the local expansion force $F_e$ at the linkage 24*b*).

Embodiments are not limited to the configuration shown in FIGS. 8A and 8B. Embodiments may include multiple spring force adjusters that are controlled synchronously by a single motor. In other embodiments, multiple independent spring force adjusters are provided, in which each spring force adjuster is independently controlled.

Figure 9A:
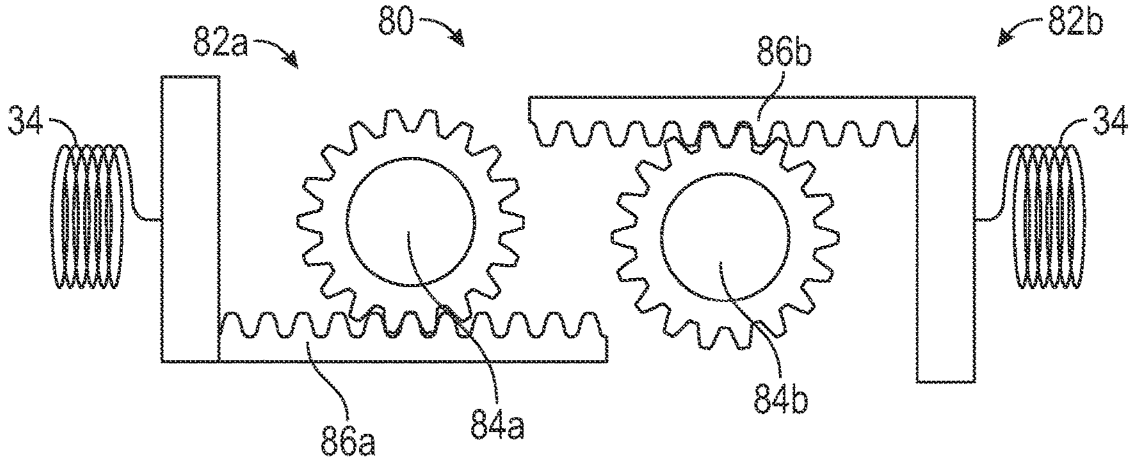
FIGS. 9A and 9B depict an adjustment device of the biasing system of FIGS. 8A and 8B, in accordance with an exemplary embodiment.
Figure 9B:
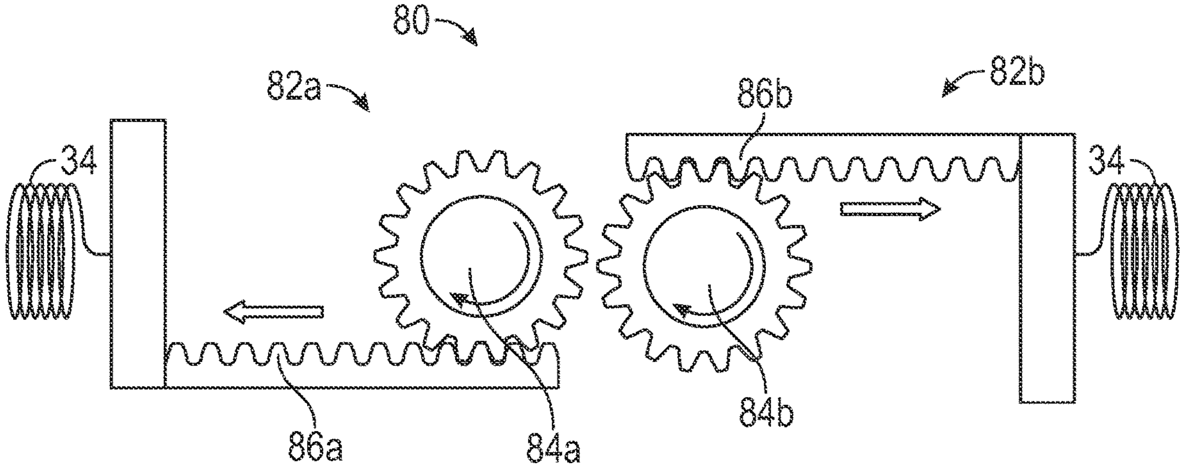

FIGS. 9A and 9B show an example in which the biasing adjustment system 80 includes two independently controllable spring adjusters 82*a* and 82*b*. Each spring adjuster 82 is coupled to a different spring or biasing device, and has its own motor. FIG. 9A shows the biasing system in a first state in which compression on the springs 34 is relatively low, and FIG. 9B shows a condition in which the spring adjusters 82*a* and 82*b* are both actuated to compress their respective springs. As each spring adjuster is independently controllable, a different amount of compression can be applied (e.g., the spring adjusters 82*a* and 82*b* are controlled so that one of the springs 34 has a different compression than an opposing spring 34). In this way, the reverse force on each side of the pressure plate 22 can be adjusted as needed to balance the pressure in the cell 14.

Control of the biasing adjustment system 80 may be performed in various ways to compensate for non-uniform or un-balanced pressures. For example, the controller 92 is configured to control the spring adjuster 82 based on pressure measurements, force measurements or any other measurements related to pressure (e.g., temperature). Such measurements may be performed at various locations.

Figure 10:
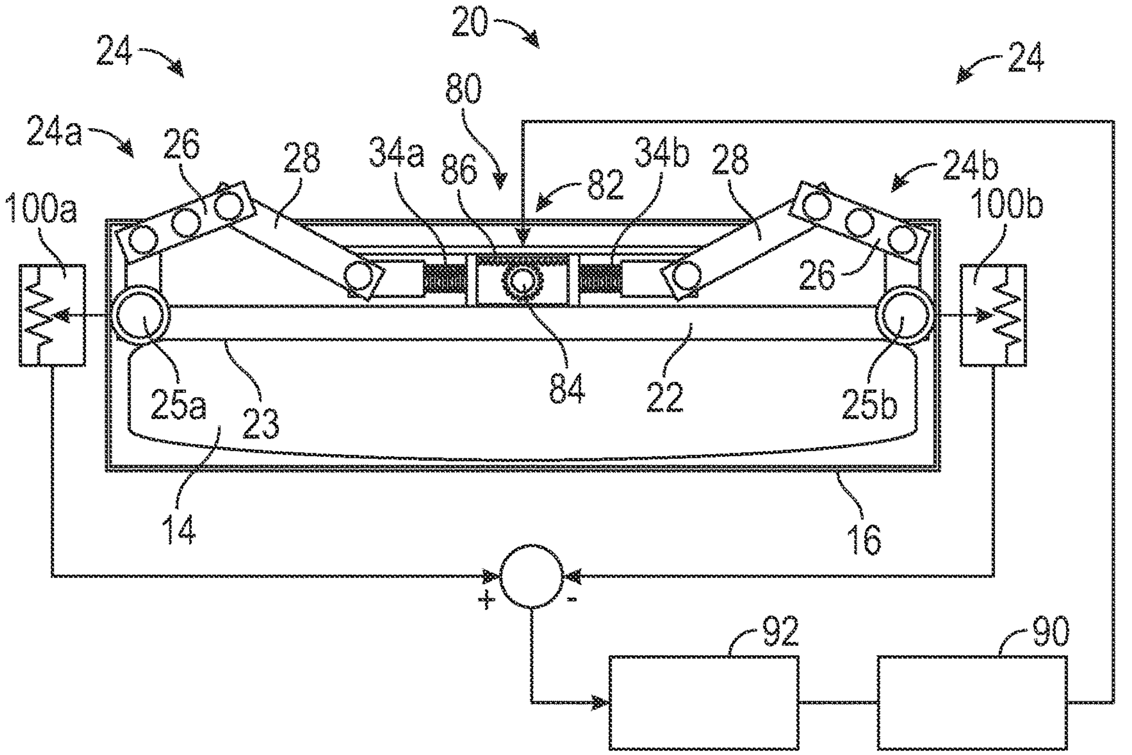
FIG. 10 depicts an energy storage system including a pressure management system including one or more mechanical linkages and an adjustable biasing system attached to a pressure plate, and a control architecture for adjusting the biasing system to control an internal pressure of a battery cell, in accordance with an exemplary embodiment.

FIG. 10 shows an embodiment of the pressure management system, which includes a potentiometer at each end of the pressure plate 22. For example, a potentiometer 100*a* is disposed proximate to the wheel 25*a*, such that the vertical position of the wheel 25*a* (e.g., position along the z-axis and/or along a side wall of the housing 16) can be measured. A potentiometer 100*b* is similarly disposed proximate to the wheel 25*b*. The controller 92 detects signals from each potentiometer, and determines whether there is a difference between the positions of the wheels. If an imbalance (e.g., a difference above zero or above another threshold) is detected, the controller 92 operates the actuator 90 (See FIG. 8A) to adjust the spring 34*a* and/or the spring 34*b* (i.e., compress or decompress) until a balanced condition is detected.

Figure 11:
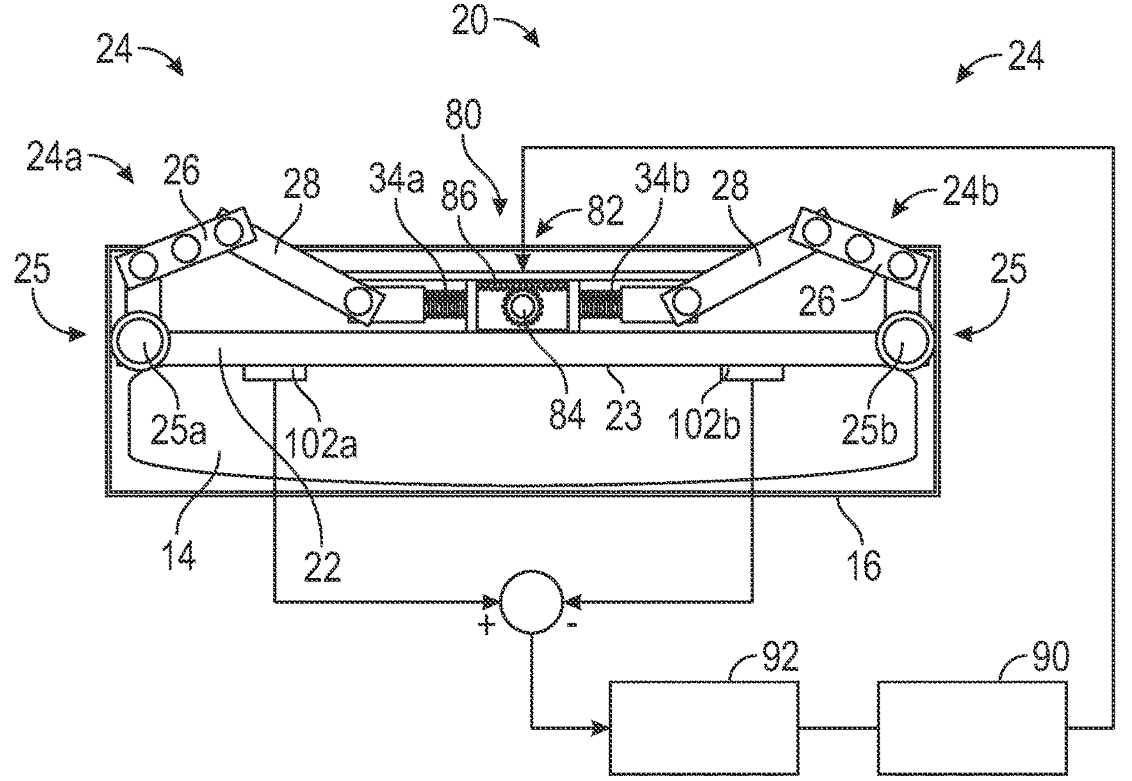
FIG. 11 depicts an energy storage system including a pressure management system including one or more mechanical linkages and an adjustable biasing system attached to a pressure plate, and a control architecture for adjusting the biasing system to control an internal pressure of a battery cell, in accordance with an exemplary embodiment.

FIG. 11 shows an alternative embodiment. In this embodiment, measurements are taken by pressure sensors 102 disposed at the surface 23 or disposed on a surface of the battery cell 14. For example, pressure sensors 102*a* and 102*b* are disposed at locations at opposing sides of the pressure plate 22, and the controller 92 compares pressure differences and controls the spring adjuster 82 accordingly.

Figure 12:
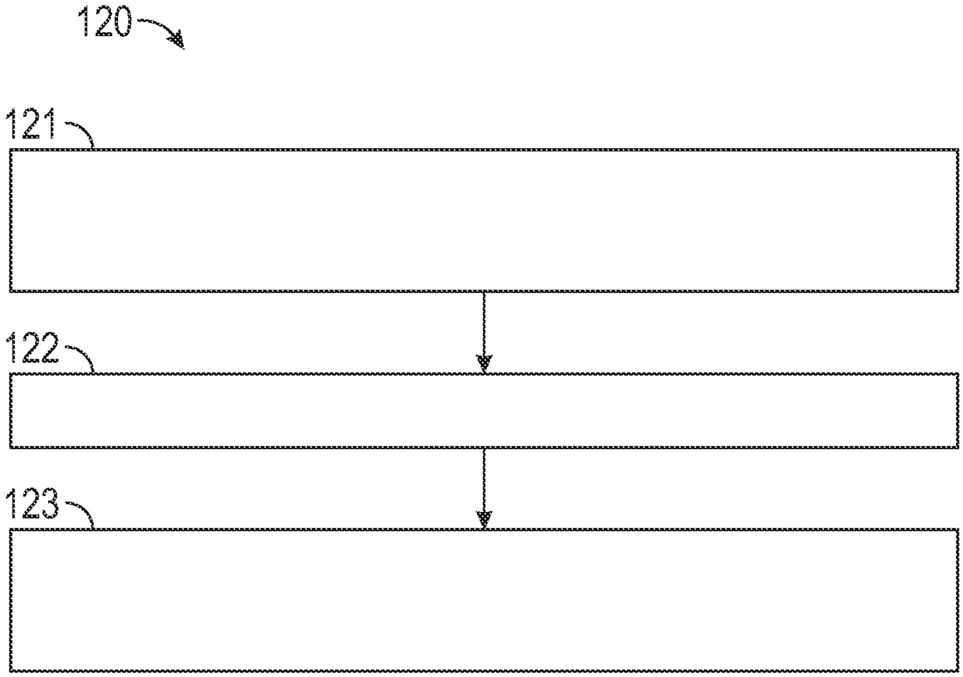
FIG. 12 is a flow diagram describing a method of managing pressure in a battery system, in accordance with an exemplary embodiment.

FIG. 12 illustrates an embodiment of a method 120 of managing pressure of a battery assembly. Aspects of the method 120, such as adjustment of a biasing system, may be performed by a processor or processors.

The method 120 includes a number of steps or stages represented by blocks 121-123. The method 120 is not limited to the number or order of steps therein, as some steps represented by blocks 121-123 may be performed in a different order than that described below, or fewer than all of the steps may be performed.

Aspects of the method 120 are discussed in conjunction with the battery cell 10 shown in FIG. 1, and the pressure management system 20 as shown in FIGS. 2A and 2B, for illustration purposes. The method 120 is not so limited and can be used with any type of battery cell and any system having linkages that reverse forces as described herein.

At block 121, a battery assembly is assembled or manufactured. The battery assembly may be a battery module, such as the module 12, having one or more battery cells. Such cells may be lithium metal type pouch cells or any other cell that is subject to expansion. Manufacture of the battery assembly includes disposing a pressure management system, such as the pressure management system of FIGS. 2A and 2B.

At block 122, the battery assembly is operated. For example, the battery module 12 is a battery pack of a vehicle, and provides electrical power to an electric motor or motors of the vehicle.

At block 123, as the battery cells expand during operation (or between operations), the pressure management system controls the pressure of a battery cell or cells of the battery assembly. This control includes applying a proportional reverse force in a direction toward the battery cell(s) to compensate for the expansion force and maintain a desired pressure or pressure range. For example, when the battery cells 14 expand, the mechanical linkages 24 and the springs 34 redirect a portion of an expansion force as a reverse force.

In an embodiment, the pressure management system is actively controlled to compensate for pressure or force imbalances and maintain a constant or balanced pressure in the battery cell. For example, the controller 92 continuously or periodically monitors pressure (e.g., by sampling potentiometers or pressure sensors), or monitors pressure in response to a user request. If an imbalance is detected, the controller 92 automatically adjusts the spring 34*a* and/or 34*b* as needed to balance the pressure.

Figure 13:
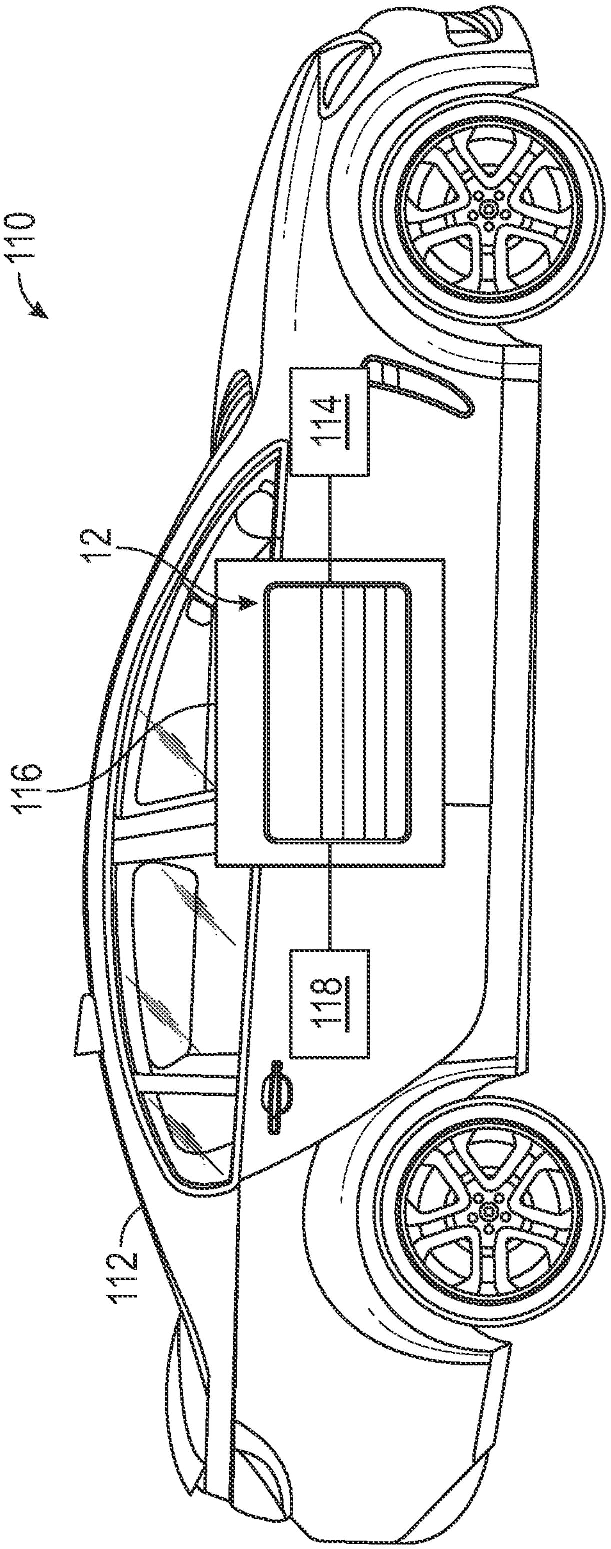
FIG. 13 depicts a motor vehicle including a battery system and a pressure management system, in accordance with an exemplary embodiment.

As noted herein, the pressure management system may be connected to, or part of a vehicle battery system. FIG. 13 shows an embodiment of a motor vehicle 110, which includes a vehicle body 112. The vehicle 110 may be a combustion engine vehicle, an electrically powered vehicle (EV) or a hybrid electric vehicle (HEV). In an example, the vehicle 110 is a hybrid or electric vehicle having an electric motor 114. A battery system 116 is electrically connected to the motor 114 and/or other components, such as vehicle electronics. The battery system 116 includes one or more modules 12, and each module 12 defines or is part of a high voltage battery pack.

The vehicle 110 also includes one or more processing devices, such as a controller 118. The controller 118 may perform various functions, such as controlling conversion devices (e.g., one or more inverters and/or one or more direct current (DC)-DC converters), controlling components of the battery management system (e.g., the spring adjuster 82), and/or monitoring the motor 114 and/or battery system 116, and others. The controller 118 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 118 may include a non-transitory computer-readable medium that stores instructions which, when processed by one or more processors of the controller 118, implements methods of operating vehicle components and systems as desired.

Figure 14:
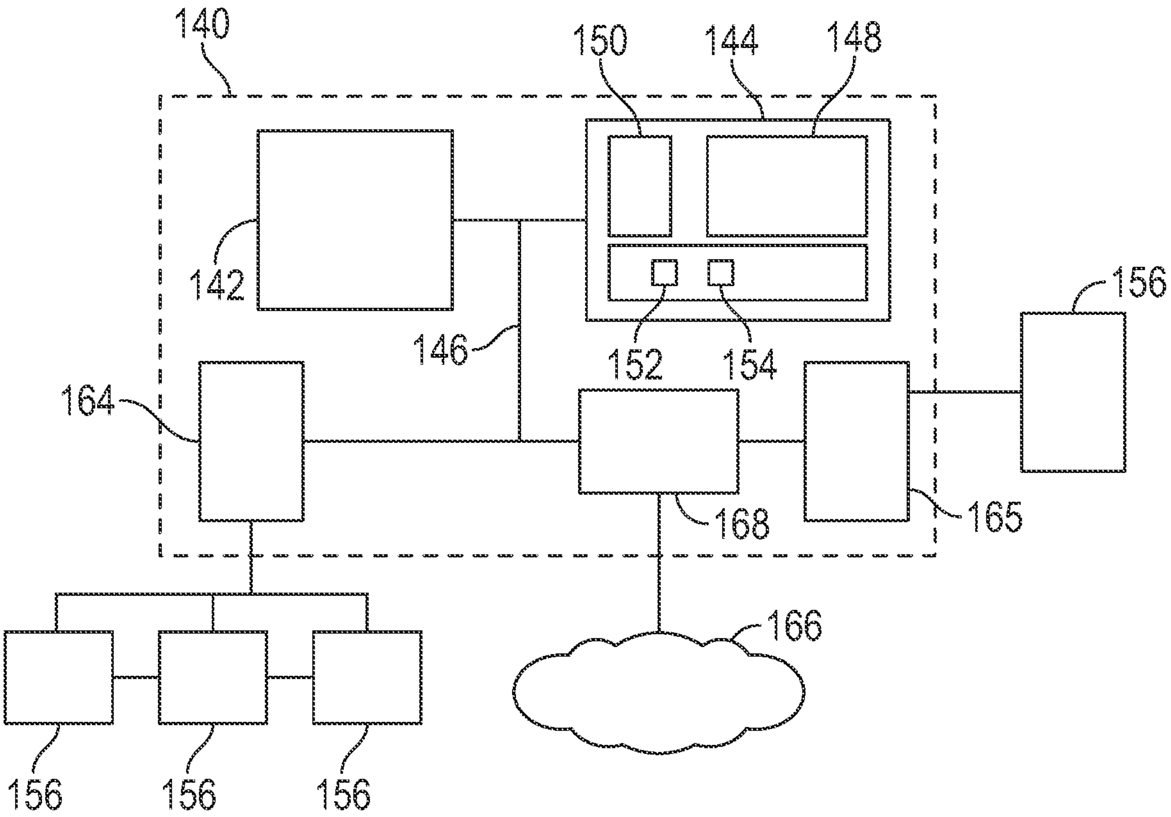
FIG. 14 depicts a computer system in accordance with an exemplary embodiment.

FIG. 14 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to monitoring battery systems. An image analysis module 154 may be included for controlling aspects of pressure management, such as controlling the actuator of the spring adjuster as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A pressure management system comprising:

a pressure plate configured to be disposed at an initial position relative to a battery cell, the battery cell disposed in a housing, the initial position including a first orientation, wherein expansion of the battery cell causes an expansion force to be applied to the pressure plate;

a tilting assembly configured to allow the pressure plate to change from the first orientation to a second orientation based on the expansion force being non-uniform;

a mechanical linkage attached to the pressure plate, the mechanical linkage configured to move laterally in response to the expansion force and translate the expansion force to a reactive force that is opposed to the expansion force; and a biasing system including a biasing member configured to resist a lateral movement of the mechanical linkage, the biasing system configured to apply a biasing force in a direction opposite a direction of the lateral movement, the biasing force causing the mechanical linkage to apply the reactive force as a selected proportion of the expansion force, wherein based on the expansion force being non-uniform, the biasing system is controllable to change the biasing force and the reactive force to balance an internal pressure of the battery cell, wherein the biasing system includes a bias control device connected to the pressure plate, the bias control device configured to be operated to adjust the biasing force of the biasing member.

2. The pressure management system of claim 1, wherein a surface of the pressure plate defines a plane that is orthogonal to a direction of the expansion force when the pressure plate is in the first orientation, and the surface defines an angle relative to the plane when the pressure plate is in the second orientation.

3. The pressure management system of claim 1, wherein the tilting assembly includes a wheel attached to an end of the pressure plate, the wheel configured to engage a side wall of the housing and rotate along the side wall.

4. The pressure management system of claim 1, wherein the biasing member has a spring constant selected so that the biasing force causes the reactive force to be the selected proportion of the expansion force.

5. The pressure management system of claim 1, wherein the tilting assembly includes a first wheel and a second wheel, and the biasing system is configured to adjust the biasing force based on a difference between a first position of the first wheel and a second position of the second wheel.

6. The pressure management system of claim 1, wherein the bias control device is configured to restrict the lateral movement of the mechanical linkage, the reactive force generated based on the bias control device causing a portion of a lateral force generated by the mechanical linkage to be directed toward the battery cell.

7. The pressure management system of claim 6, wherein the biasing member is a spring having a first end configured to be coupled to the mechanical linkage, and a second end connected to the bias control device.

8. The pressure management system of claim 1, wherein the biasing system includes a set of sensors configured to measure a parameter related to the internal pressure, and a controller configured to estimate a pressure imbalance based on the measured parameter and control the bias control device to balance the internal pressure.

9. The pressure management system of claim 1, wherein the bias control device includes a pinion gear coupled to a linear gear, the pinion gear connected to an actuator, the actuator configured to rotate the pinion gear to adjust the biasing force.

10. A method of controlling a pressure of a battery cell, comprising:

receiving an expansion force at a pressure plate disposed at an initial position relative to the battery cell, the battery cell disposed in a housing, the initial position including a first orientation, the expansion force resulting from expansion of the battery cell, the pressure plate coupled to a tilting assembly configured to allow the pressure plate to change from a first orientation to a second orientation based on the expansion force being non-uniform; and managing a pressure of the battery cell by a pressure management system including a mechanical linkage attached to the pressure plate and a biasing system, wherein the biasing system includes a bias control device connected to the pressure plate, the bias control device configured to be operated to adjust the biasing force of the biasing member wherein managing the pressure includes:

translating the expansion force to a reactive force based on a lateral movement of the mechanical linkage, the reactive force configured to oppose the expansion force;

controlling the reactive force based on resisting the lateral movement of the mechanical linkage by a biasing member of the biasing system, the biasing system applying a biasing force in a direction opposite a direction of the lateral movement, the biasing force causing the mechanical linkage to apply the reactive force as a selected proportion of the expansion force; and based on the expansion force being non-uniform, adjusting the biasing force and the reactive force to balance an internal pressure of the battery cell.

11. The method of claim 10, wherein the tilting assembly includes a wheel attached to an end of the pressure plate, the wheel configured to engage a side wall of the housing and rotate along the side wall.

12. The method of claim 10, wherein the biasing member has a spring constant selected so that the biasing force causes the reactive force to be the selected proportion of the expansion force.

13. The method of claim 10, wherein the tilting assembly includes a first wheel and a second wheel, and the biasing system is configured to adjust the biasing force based on a difference between a first position of the first wheel and a second position of the second wheel.

14. The method of claim 10, wherein the bias control device is configured to restrict the lateral movement of the mechanical linkage, the reactive force generated based on the bias control device causing a portion of a lateral force generated by the mechanical linkage to be directed toward the battery cell.

15. The method of claim 10, wherein the biasing system includes a set of sensors configured to measure a parameter related to the internal pressure, and a controller configured to estimate a pressure imbalance based on the measured parameter and control the bias control device to balance the internal pressure.

16. The method of claim 10, wherein the bias control device includes a pinion gear coupled to a linear gear, the pinion gear connected to an actuator, and adjusting the biasing force includes rotating the pinion gear by the actuator.

17. A vehicle system comprising:

a battery system connected to an electric motor of a vehicle, the battery system including a battery cell disposed in a housing; and a pressure management system including:

a pressure plate disposed at an initial position relative to the battery cell, the battery cell disposed in a housing, the initial position including a first orientation, wherein expansion of the battery cell causes an expansion force to be applied to the pressure plate;

a tilting assembly configured to allow the pressure plate to change from the first orientation to a second orientation based on the expansion force being non-uniform;

a mechanical linkage attached to the pressure plate, the mechanical linkage configured to move laterally in response to the expansion force and translate the expansion force to a reactive force that is opposed to the expansion force; and a biasing system including a biasing member configured to resist a lateral movement of the mechanical linkage, the biasing system configured to apply a biasing force in a direction opposite a direction of the lateral movement, the biasing force causing the mechanical linkage to apply the reactive force as a selected proportion of the expansion force, wherein the biasing system includes a bias control device connected to the pressure plate, the bias control device configured to be operated to adjust the biasing force of the biasing member, and wherein:

based on the expansion force being non-uniform, the biasing system is controllable to change the biasing force and the reactive force to balance an internal pressure of the battery cell.

18. The vehicle system of claim 17, wherein the tilting assembly includes a wheel attached to an end of the pressure plate, the wheel configured to engage a side wall of the housing and rotate along the side wall.

19. The vehicle system of claim 17, wherein the reactive force is generated based on the bias control device causing a portion of a lateral force generated by the mechanical linkage to be directed toward the battery cell.

20. The vehicle system of claim 19, wherein the biasing system includes a set of sensors configured to measure a parameter related to the internal pressure, and a controller configured to estimate a pressure imbalance based on the measured parameter and control the bias control device to balance the internal pressure.

* * * * *